United States Patent
Isobe et al.

(10) Patent No.: US 9,815,158 B2
(45) Date of Patent: Nov. 14, 2017

(54) ROTARY-MAGAZINE TOOL CHANGER CAPABLE OF CHANGING TOOL STORAGE POSITION

(71) Applicant: FANUC Corporation, Yamanashi (JP)

(72) Inventors: Gaku Isobe, Yamanashi (JP); Masahiro Murota, Yamanashi (JP); Naoki Sato, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 143 days.

(21) Appl. No.: 14/742,759

(22) Filed: Jun. 18, 2015

(65) Prior Publication Data
US 2015/0367466 A1 Dec. 24, 2015

(30) Foreign Application Priority Data
Jun. 19, 2014 (JP) .................. 2014-126528

(51) Int. Cl.
*B23Q 3/157* (2006.01)
*G05B 19/18* (2006.01)
(Continued)

(52) U.S. Cl.
CPC ..... *B23Q 3/15706* (2013.01); *B23Q 3/15534* (2016.11); *B23Q 3/15503* (2016.11);
(Continued)

(58) Field of Classification Search
CPC ...... B23Q 3/15503; G05B 2219/34347; G05B 2219/36362; G05B 2219/36364; G05B 2219/50242; G05B 2219/50272; G05B 2219/50238; G05B 2219/36361; Y10T 483/10; Y10T 483/12; Y10T 483/123; Y10T 483/127; Y10T 483/13; Y10T 483/132; Y10T 483/134; Y10T 483/136; Y10T 483/138; Y10T 483/14
(Continued)

(56) References Cited

U.S. PATENT DOCUMENTS 4,107,589 A    8/1978  Eto et al.
4,631,465 A *  12/1986 Fukuyama ......... G05B 19/4069
                                                318/565
(Continued)

FOREIGN PATENT DOCUMENTS

JP    53-15680 A    2/1978
JP    61-236450 A   10/1986
(Continued)

OTHER PUBLICATIONS

Machine translation of JP 04-164538-A, which JP '538 was published Jun. 1992.*
Decision to Grant a Patent in JP Application No. 2014-126528, dated Dec. 22, 2015.
Office Action mailed Oct. 6, 2015, corresponding to Japanese Patent Application No. 2014-126528.

*Primary Examiner* — Erica E Cadugan
(74) *Attorney, Agent, or Firm* — Hauptman Ham, LLP

(57) ABSTRACT

A tool changer for a machine tool is provided with a command unit for outputting a change command for a tool storage position to a control unit, which turns a tool magazine with a tool mounted on a spindle and controls an index unit to index a predetermined tool grip portion to a tool change position on receiving the change command for the tool storage position from the command unit.

10 Claims, 6 Drawing Sheets

(51) Int. Cl.
*B23Q 17/00* (2006.01)
*B23Q 11/00* (2006.01)
*B23Q 3/155* (2006.01)

(52) U.S. Cl.
CPC .......... *B23Q 3/15546* (2013.01); *B23Q 11/00* (2013.01); *B23Q 17/00* (2013.01); *G05B 2219/34347* (2013.01); *G05B 2219/36361* (2013.01); *G05B 2219/36362* (2013.01); *G05B 2219/36364* (2013.01); *G05B 2219/50238* (2013.01); *G05B 2219/50242* (2013.01); *Y10T 483/10* (2015.01); *Y10T 483/123* (2015.01); *Y10T 483/136* (2015.01); *Y10T 483/14* (2015.01); *Y10T 483/179* (2015.01)

(58) Field of Classification Search
USPC .................................... 483/1, 4–12; 700/179
See application file for complete search history.

(56) References Cited

U.S. PATENT DOCUMENTS

| | | | |
|---|---|---|---|
| 4,870,744 A | | 10/1989 | Araki et al. |
| 5,383,832 A | * | 1/1995 | Blazek .................. B23Q 3/155 483/1 |
| 2007/0293379 A1 | * | 12/2007 | Feinauer ................ B23Q 3/155 483/1 |

FOREIGN PATENT DOCUMENTS

| | | | |
|---|---|---|---|
| JP | 62-218037 A | | 9/1987 |
| JP | 63-62630 A | | 3/1988 |
| JP | 02-139149 A | * | 5/1990 |
| JP | 04-164538 A | * | 6/1992 |
| JP | H05-277866 A | | 10/1993 |
| JP | 2009-297867 A | | 12/2009 |
| WO | 2012/041799 A1 | | 4/2012 |

* cited by examiner

ROTARY-MAGAZINE TOOL CHANGER CAPABLE OF CHANGING TOOL STORAGE POSITION

RELATED APPLICATIONS

The present application claims priority to Japanese Application Number 2014-126528, filed Jun. 19, 2014, the disclosure of which is hereby incorporated by reference herein in its entirety.

BACKGROUND OF THE INVENTION

1. Field of the Invention

The present invention relates to a tool changer configured to automatically change a tool to be mounted on a spindle of a machine tool.

2. Description of the Related Art

There is known a machine tool with a tool change unit capable of reducing tool change time by rearranging tool storage positions on a tool magazine. Japanese Patent Application Laid-Open No. 5-277866 discloses a machine tool provided with a rearrangement unit for rearranging tools accommodated in the tool magazine, based on the machining order and machining time in a machining program. Japanese Patent Application Laid-Open No. 2009-297867 discloses a method of changing tool arrangement by a tool change unit comprising a main magazine and a sub-magazine and capable of delivering tools between the magazines. In this tool arrangement change method, those tools which are not expected to be moved to the sub-magazine can be designated in advance.

Further, there is known a tool change unit for a machine tool, configured to turn a tool magazine to index a tool and change the tool mounted on a spindle. The tool change unit may be of a known type in which the tool is directly transferred from the tool magazine to the spindle without using a dedicated tool change arm or the like. Since this tool change unit does not require the dedicated tool change arm and a drive unit therefor, its structure can be simplified, so that the costs can be reduced and the reliability can be improved.

FIG. 4 and FIGS. 5A and 5B show an example of a machine tool provided with a rotary-magazine tool change unit. FIG. 5A shows a case where a spindle is in a tool change area and FIG. 5B shows a case where the spindle is in a descending area. A machine tool 21 comprises a tool magazine 24 rotatable relative to a magazine shaft 22 about a pivot axis 23. Further, the tool magazine 24 is provided with radially arranged tool grip portions 25.

In tool change operation, a spindle 27 moves from a machining area to the tool change area, and a tool 28 is delivered from the spindle 27 to that one of the tool grip portions 25 which is located in a tool change position 26. Thereafter, the tool magazine 24 is turned to index that tool grip portion which is mounted with the tool to be used next to the tool change position 26. Then, the tool grip portion indexed to the tool change position 26 delivers the tool to be used next to the spindle 27. The tool mounted on the spindle 27 is changed in this manner.

FIGS. 6A, 6B, 6C and 6D are schematic views showing an example of the operation of the tool magazine during conventional tool change operation. In an operating procedure of this example, tools are changed starting with a tool A having so far been mounted on the tool grip portion of tool number 1 and ending with a tool E mounted on the tool grip portion of tool number 5.

First, the spindle moves from the machining area to the tool change area, whereupon the tool A mounted on the spindle is delivered to the tool grip portion of tool number 1 (FIG. 6A→FIG. 6B).

Then, the tool magazine 24 is turned to index the tool grip portion of tool number 5 mounted with the tool E to the tool change position (FIG. 6B→FIG. 6C).

Thereupon, the tool E is delivered from the tool grip portion of tool number 5 to the spindle 27 (FIG. 6C→FIG. 6D).

FIG. 7 is a flowchart illustrating the operation of a prior art machine tool. The following is a sequential description of steps of processing.

[Step sb01] Tool change is performed (or the tool of tool number 1 is mounted on the spindle).

[Step sb02] Machining by the tool A is performed.

[Step sb03] Tool change is performed. More specifically, the tool A is held by the tool grip portion of tool number 1, and the tool magazine 24 is turned to index the tool grip portion of tool number 5 holding the tool E to the tool change position. Thereupon, the tool E is mounted on the spindle 27.

[Step sb04] Machining by the tool E is performed, whereupon the processing ends.

Japanese Patent Application Laid-Open No. 63-062630 discloses a tool change unit that uses a spindle motor as a drive source in turning a tool magazine. In changing a tool, this tool change unit enables the tool magazine to rotate toward a spindle head during tool change, thereby attaching or detaching the tool to or from a spindle.

As described in the "BACKGROUND OF THE INVENTION", the known tool change unit is configured to change the tool storage positions on the tool magazine. In the machine tool of this type, the tool change time can be reduced by previously bringing the tool to be used next close to the tool change position.

In the conventional machine tool, however, the tool change unit should be provided with the dedicated rearrangement unit for rearranging the tools and a tool transfer unit capable of temporarily holding the tools. Thus, there is a problem that the mechanism of the tool change unit is so complicated that the costs increase and the reliability is reduced.

SUMMARY OF THE INVENTION

Accordingly, the object of the present invention is to provide a tool changer capable of reducing tool change time without using a dedicated tool rearrangement unit or the like.

According to the present invention, a position in which a tool currently in use is to be stored is changed to a position near a position in which a tool to be used next is stored by turning a tool magazine with a spindle in a machining area, that is, with the tool mounted on the spindle.

A tool changer for a machine tool according to the present invention comprises a rotary tool magazine capable of attaching and detaching a tool to and from a spindle of the machine tool, tool grip portions circumferentially disposed on the tool magazine, an index unit configured to turn the tool magazine with the tool mounted on the spindle, and a control unit configured to control the index unit during tool change, store the tool mounted on the spindle into the tool grip portion indexed to a tool change position of the tool magazine, index a tool grip portion stored with a tool to be used next to the tool change position, and mount the tool on the spindle. The tool changer comprises a command unit for outputting a change command for the tool storage position to the control unit, and the control unit turns the tool magazine with the tool mounted on the spindle and controls the index unit to index a predetermined tool grip portion to the tool change position on receiving the change command for the tool storage position from the command unit.

According to the above arrangement, the tool storage position can be changed by the tool changer for a machine tool of a simple structure that does not have such a unit as a tool change arm for temporarily holding a tool. Thus, the storage position for the tool currently in use can be previously changed to a position near the tool to be used next, so that the tool change time can be reduced despite the simple structure of the tool changer.

The tool changer for a machine tool described above may comprise a storage unit configured to store a machining program including a block for commanding the storage position for the tool mounted on the spindle to be changed to a designated tool storage position, and the command unit may be configured to issue the change command for the tool storage position to the control unit when the block for commanding the change of the tool storage position is read by the command unit during the execution of the machining program by the control unit.

According to the above arrangement, the change of the tool storage position can be commanded during the execution of the machining program by making an entry of the block for commanding the tool storage position change in an appropriate position in the machining program.

The tool changer for a machine tool described above may comprise a data input unit for inputting the presence/absence of the tool in each of the tool grip portions on the tool magazine and a recording unit for recording input data on the presence/absence of the tool, and the control unit may comprise an alarm output unit configured to issue a warning when the change of the tool storage position is commanded from the command unit to the tool grip portion already mounted with the tool, based on the recorded input data on the presence/absence of the tool.

According to the above arrangement, such a failure as tool falling due to tool interference can be prevented if the tool grip portion already mounted with the tool is erroneously designated when the change of the tool storage position is commanded.

The tool changer for a machine tool described above may comprise a tool detection unit for detecting the presence/absence of the tool in each of the tool grip portions on the tool magazine and a recording unit for recording detection data on the presence/absence of the tool detected by the tool detection unit, and the control unit may comprise an alarm output unit configured to issue a warning when the change of the tool storage position is commanded to the tool grip portion already mounted with the tool, based on the recorded detection data on the presence/absence of the tool.

According to the above arrangement, an operator can be prevented from erroneously indexing the magazine to the tool grip portion already mounted with the tool when the change of the tool storage position is commanded, without directly inputting the presence/absence of the tool in each of the tool grip portions. Thus, such a failure as tool falling due to tool interference can be prevented.

The tool changer for a machine tool described above may comprise a data input unit for inputting the presence/absence of the tool in each of the tool grip portions on the tool magazine and a recording unit for recording input data on the presence/absence of the tool. The command unit may be configured to analyze a machining program executed by the machine tool, specify the tool grip portion stored with a tool to be used next, and identify the position of the tool grip portion mounted with none of the tools on the tool magazine, based on the input data of the recording unit on the presence/absence of the tool, and the command unit may be configured to automatically give a command to the control unit to change the tool storage position to that tool grip portion, among the other tool grip portions without any of the tools therein, which is located at the shortest distance of rotation from the tool grip portion stored with the tool to be used next.

According to the above arrangement, the control unit can automatically change the tool storage position so as to reduce the tool change time without commanding a change position for the tool storage position on the machining program.

The tool changer for a machine tool described above may comprise a tool detection unit for detecting the presence/absence of the tool in each of the tool grip portions on the tool magazine and a recording unit for recording detection data on the presence/absence of the tool detected by the tool detection unit, and the command unit may be configured to analyze a machining program executed by the machine tool, specify the tool grip portion stored with a tool to be used next, identify the position of the tool grip portion mounted with none of the tools, based on the detection data of the recording unit on the presence/absence of the tool, and automatically give a command to the control unit to change the tool storage position to that tool grip portion, among the other tool grip portions without any of the tools therein, which is located at the shortest distance of rotation from the tool grip portion stored with the tool to be used next.

According to the above arrangement, the control unit can automatically change the tool storage position so as to reduce the tool change time without commanding a change position for the tool storage position on the machining program. Further, an operator need not directly input the presence/absence of the tool in each of the tool grip portions.

The recording unit may be configured to record the weight and arrangement of the tool on the tool magazine, and the control unit may comprise an output unit and configured to calculate a difference between the total weight of the tool on one-side area of the tool magazine, which is halved by each of two or more predetermined planes containing a pivot axis of the tool magazine, and the total weight of the tool on the other-side area, with reference to the recording unit, define the maximum of differences between the tool weights calculated for the two or more predetermined planes as a tool weight deflection value, previously calculate the tool weight deflection value after the change of the tool storage position during the execution of the tool storage position change, and send a command to the output unit and the output unit is configured to display an alarm or a message if the previously calculated tool weight deflection value is not lower than a predetermined value.

According to the above arrangement, a failure in the tool changer due to tool weight deflection exceeding a fixed value can be prevented when the tool storage position is changed.

The recording unit may be configured to record the weight and arrangement of the tool on the tool magazine, and the control unit may be configured to calculate a difference between the total weight of the tool on one-side area of the tool magazine, which is halved by each of two or more predetermined planes containing a pivot axis of the tool magazine, and the total weight of the tool on the other-side area, with reference to the recording unit, define the maximum of differences between the tool weights calculated for the two or more predetermined planes as a tool weight deflection value, previously calculate the tool weight deflection value after the change of the tool storage position during the execution of the tool storage position change, and modify the tool change position to be changed to the tool grip portion located at the next shortest distance of rotation from the next tool, not to the tool grip portion located at the shortest distance, if the previously calculated tool weight deflection value is not lower than a predetermined value.

According to the above arrangement, a failure in the tool changer due to tool weight deflection exceeding a fixed value can be prevented by automatically modifying the change destination of the tool storage position.

The tool changer for a machine tool described above may comprise a data input unit for inputting tool arrangement data on the tool magazine. The recording unit may be configured to record the tool arrangement data on the tool magazine input by the data input unit, and the control unit may be configured to rewrite the tool arrangement data recorded by the recording unit when the tool storage position is changed.

According to the above arrangement, the tool arrangement can be automatically updated after the change of the tool storage position, so that the trouble of previously commanding change of the tool arrangement data on the program or re-inputting the tool arrangement can be saved.

The tool changer for a machine tool described above may comprise a display unit for displaying the tool arrangement data on the tool magazine.

According to the above arrangement, an operator can easily check the tool arrangement even when the tool storage position is changed.

According to the present invention configured as described above, the storage position for the tool currently in use can be previously changed to reduce the distance from the tool to be used next, in the tool changer of the simple structure that does not have such a tool transfer unit as a tool change arm. Thus, the tool change time can be reduced by only storing the tool currently in use in a tool storage position of a tool number right near the storage position for the tool to be used next.

The storage position can be changed to reduce the time required for the tool change without using any rearrangement unit. Thus, the reduction in the tool change time of the machine tool can be reconciled with low-cost, high-reliability performance.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Some embodiments of the present invention will now be described also with reference to the contents described in the "BACKGROUND OF THE INVENTION", that is, based on the configuration of the machine tool 21.

Figure 1:
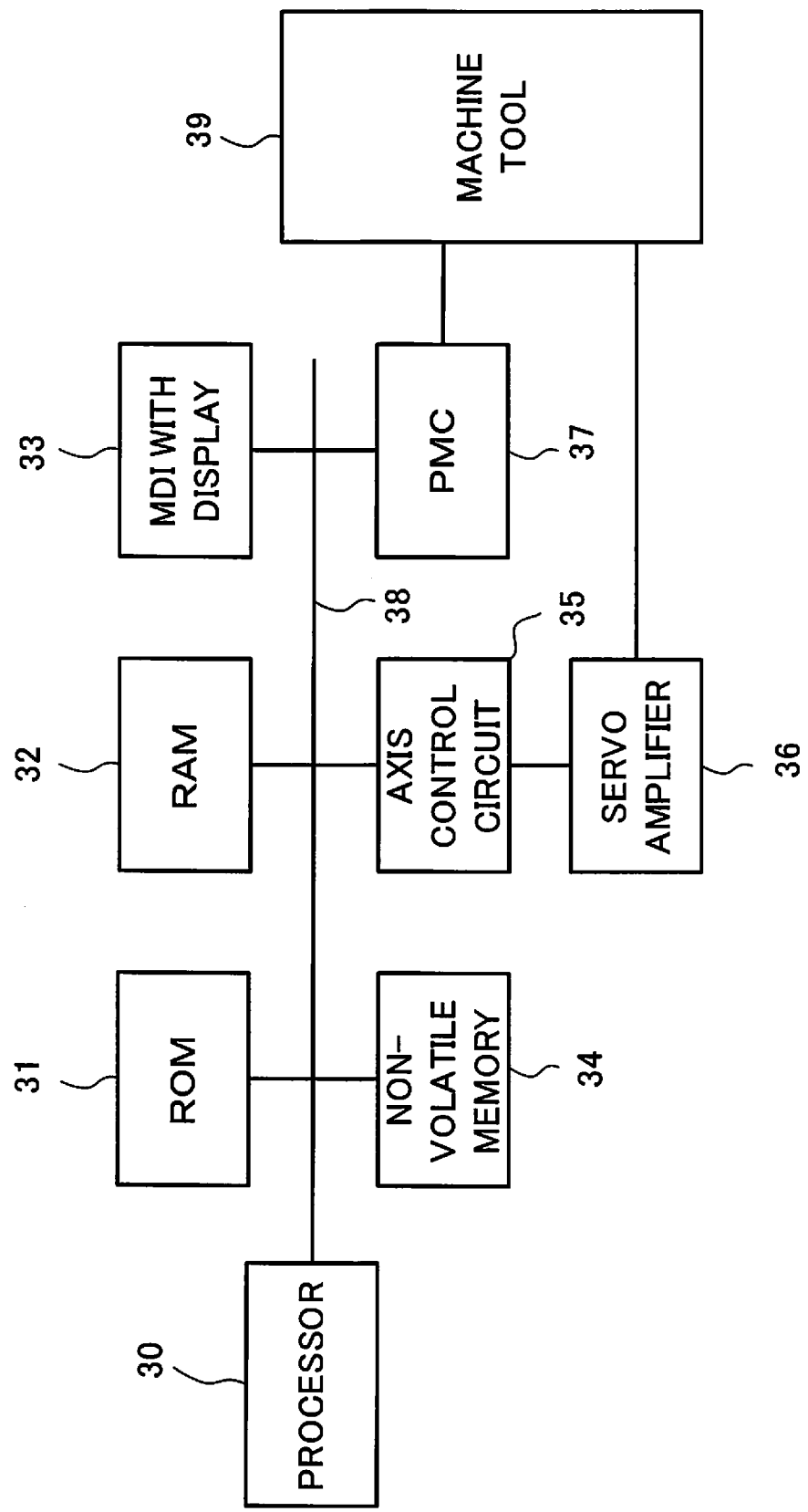
FIG. 1 is a diagram illustrating a control unit for controlling a machine tool with a tool changer according to one embodiment of the present invention.

FIG. 1 is a diagram illustrating a control unit for controlling a machine tool 39 with a tool changer according to one embodiment of the present invention. The control unit mainly comprises a processor 30. The processor 30 controls the whole of a numerical controller according to a system program stored in a ROM 31. A RAM 32 is loaded with temporary calculation data, display data, input/output signals, and the like. A nonvolatile memory 34 is stored with parameters, machining programs, tool correction data, and the like to be held even after the power is turned off. An MDI with display (machine control panel with a display unit) 33 is disposed, for example, on the front of the numerical control unit and is used for data and graphics display, data input, and operation of the numerical control unit.

A machining program to be used for machining can be selected from the machining programs in the nonvolatile memory 34 by using an input unit (not shown), such as a keyboard and soft keys, attached to the MDI with display 33. The MDI 33 can also be used to turn on a tool change mode (tool change operation mode, described later) during initial setup. On receiving a movement command from the processor, an axis control circuit 35 outputs an axis movement command to a servo amplifier 36. The servo amplifier 36 drives a servomotor connected to the machine tool 39 and controls the relative motion of a tool of the machine tool and a workpiece. In the present embodiment, a magazine drive motor for driving a tool magazine of the tool changer for rotation is driven by the servomotor.

A PMC 37 receives an M (auxiliary) function signal, S (spindle speed control) function signal, T (tool selection) function signal, etc., from the processor 30 through a bus 38, processes these signals according to sequence programs, and delivers output signals, thereby controlling an actuator and the like of the machine tool. In response to button and switch signals from the machine control panel (see FIG. 4) in the machine tool 21, moreover, sequential processing is performed so that necessary input signals are transferred to the processor 30 through the bus 38. The numerical control unit described above differs in configuration from its conventional counterpart only in that it has an automatic tool change function to optimize the initial setup.

Figure 4:
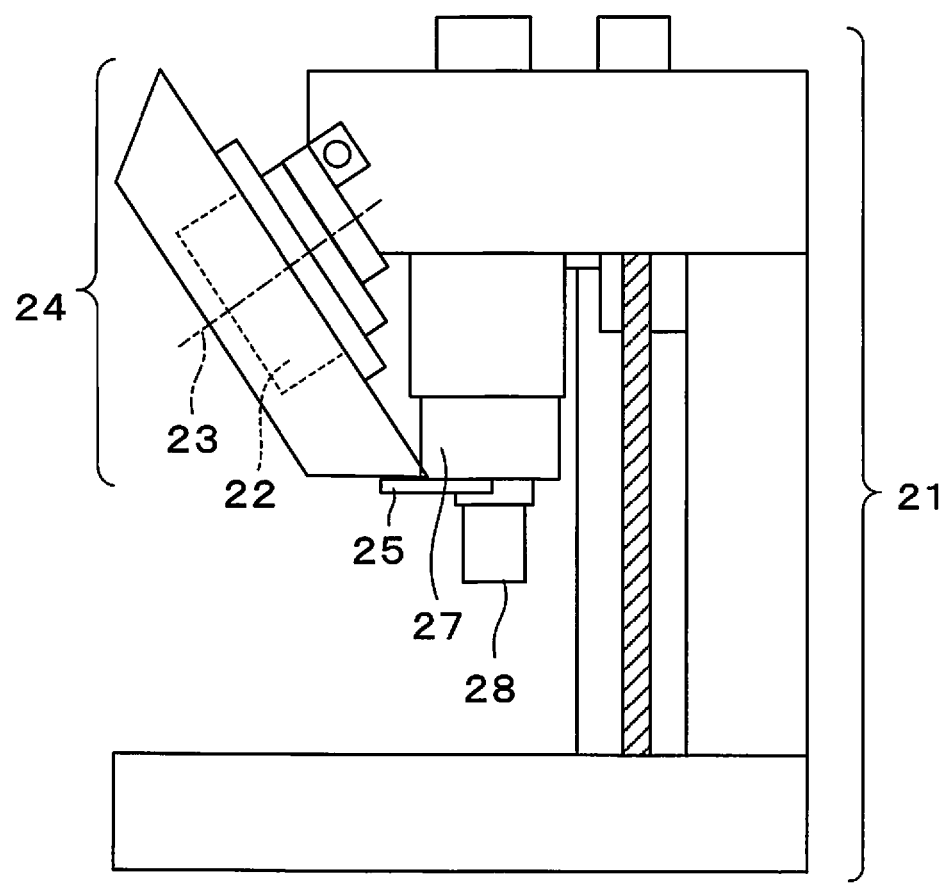
FIG. 4 is a schematic side view of the machine tool with the rotary-magazine tool changer.

A tool changer according to the present embodiment is characterized in that it comprises the control unit and the magazine drive motor (not shown) capable of driving the tool magazine for rotation when a spindle is in a machining area, that is, when the tool is kept mounted on the spindle. FIG. 4 shows an example of the machine tool provided with the tool change unit. As mentioned before, the machine tool 21 comprises a tool magazine 24 rotatable relative to a magazine shaft 22 about a pivot axis 23. Further, the tool magazine 24 is provided with radially arranged tool grip portions 25, which are identified by tool numbers 1 to 12, individually. The tool changer is controlled by the control unit for controlling the machine tool 21.

FIGS. 2A, 2B, 2C, 2D and 2E are schematic views showing the operation of the tool changer according to the present embodiment during tool change. In an operating procedure of this example, as in the prior art example, tools are changed starting with a tool A having so far been mounted on the tool grip portion of tool number 1 and ending with a tool E mounted on the tool grip portion of tool number 5. In the operating procedure of this example, the tool grip portion of tool number 6 is designated as the change destination of a storage position for the tool A.

Figure 2A:
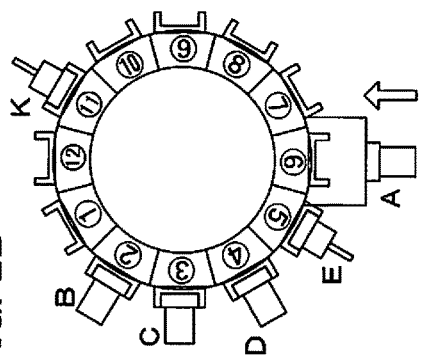
FIGS. 2A, 2B, 2C, 2D and 2E are views showing an outline of tool change (A→E) according to the one embodiment of the invention.
Figure 2B:
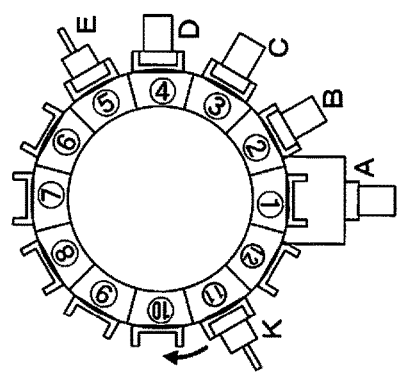
Figure 5A:
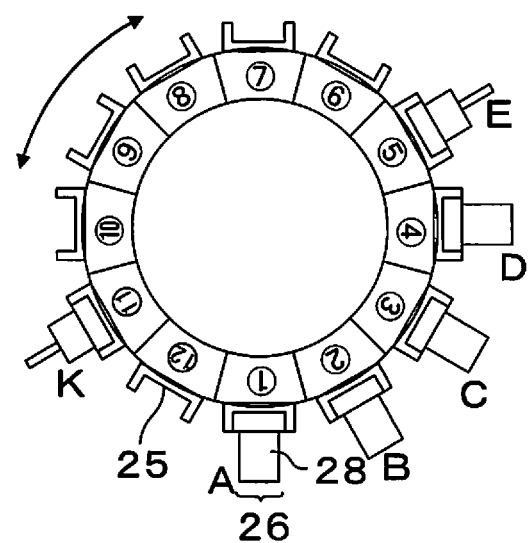
FIGS. 5A and 5B are front views of the rotary-magazine tool changer.
Figure 5B:
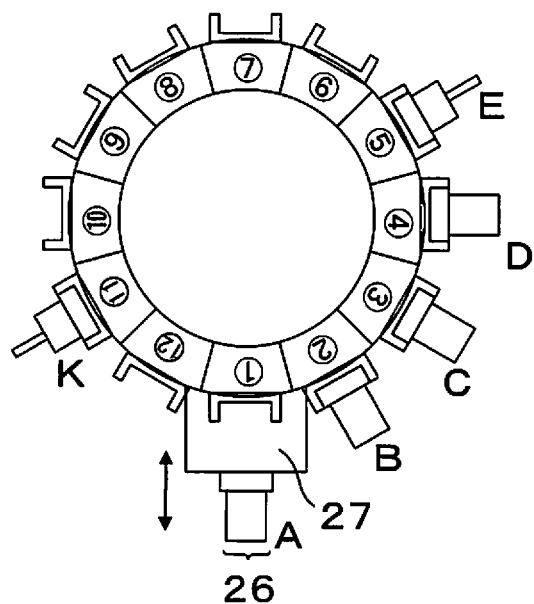
Figure 6A:
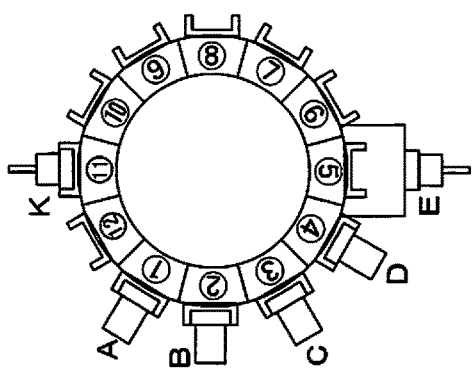
FIGS. 6A, 6B, 6C and 6D are views showing an outline of conventional tool change (A→E)
Figure 6B:
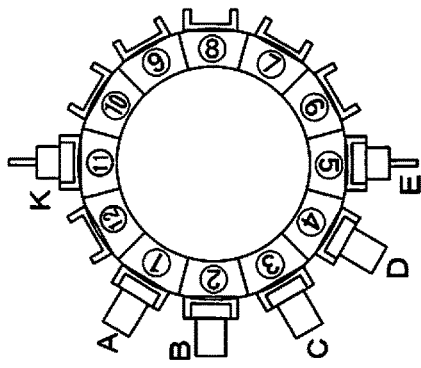
Figure 6C:
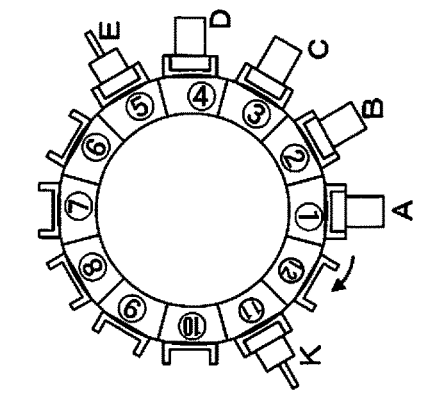
Figure 6D:
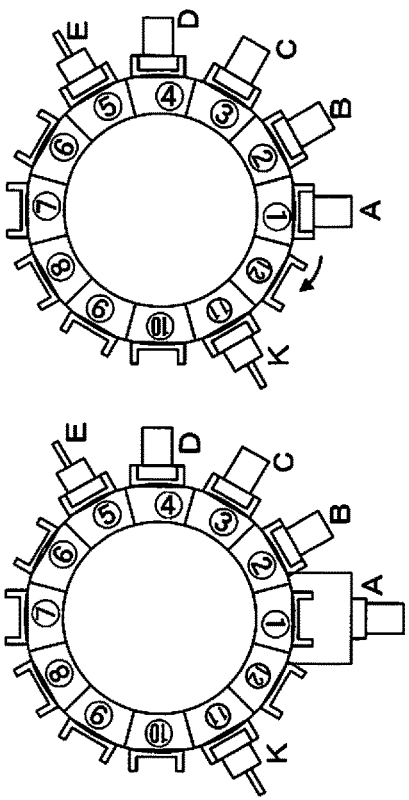

While the spindle 27 is in the machining area (during machining operation), the tool changer previously turns the tool magazine 24 to index the tool grip portion of tool number 6 to a tool change position 26 (see FIGS. 5A and 5B) (FIG. 2A→FIG. 2B). In tool change operation, the spindle first moves from the machining area to a tool change area, whereupon the tool A mounted on the spindle is delivered to the tool grip portion of tool number 6 (FIG. 2B→FIG. 2C).

Figure 2C:
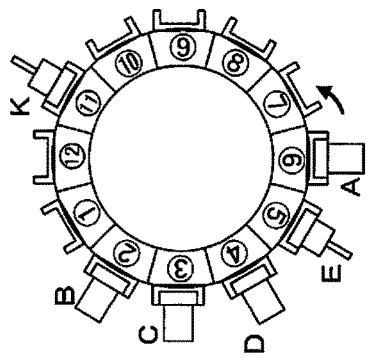
Figure 2E:
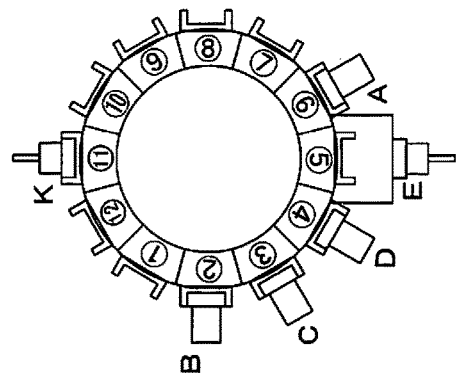
Figure 2D:
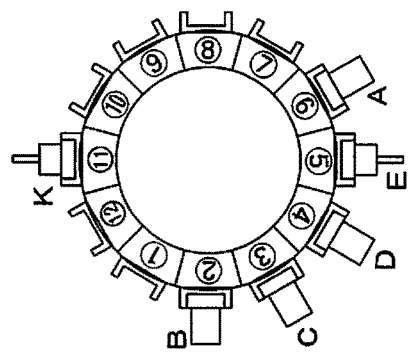

Then, the tool magazine 24 is turned to index the tool grip portion of tool number 5 mounted with the tool E to the tool change position 26 (FIG. 2C→FIG. 2D).

Thereupon, the tool E is delivered from the tool grip portion of tool number 5 to the spindle (FIG. 2D→FIG. 2E).

In the case of this method, the magazine indexing amount for the tool change can be reduced by previously bringing the storage position for a tool currently in use close to the position for a tool to be used next when the tool storage position in which the tool currently in use has been stored and the storage position for the tool to be used next are distant. Thus, the tool change time can be reduced.

More specifically, the tool A having been stored in the tool grip portion of tool number 1 is not returned to the same tool grip portion after the end of the machining operation, but is stored in the tool grip portion of tool number 6 adjacent to the tool grip portion of tool number 5 in which the tool E to be used next is stored. The tool grip portion of tool number 5 is moved to the tool change position, and the tool E held by this tool grip portion is mounted on the spindle 27. Since indexing from tool number 1 to tool number 6 can be performed during the machining, it does not affect the change time.

Figure 3:
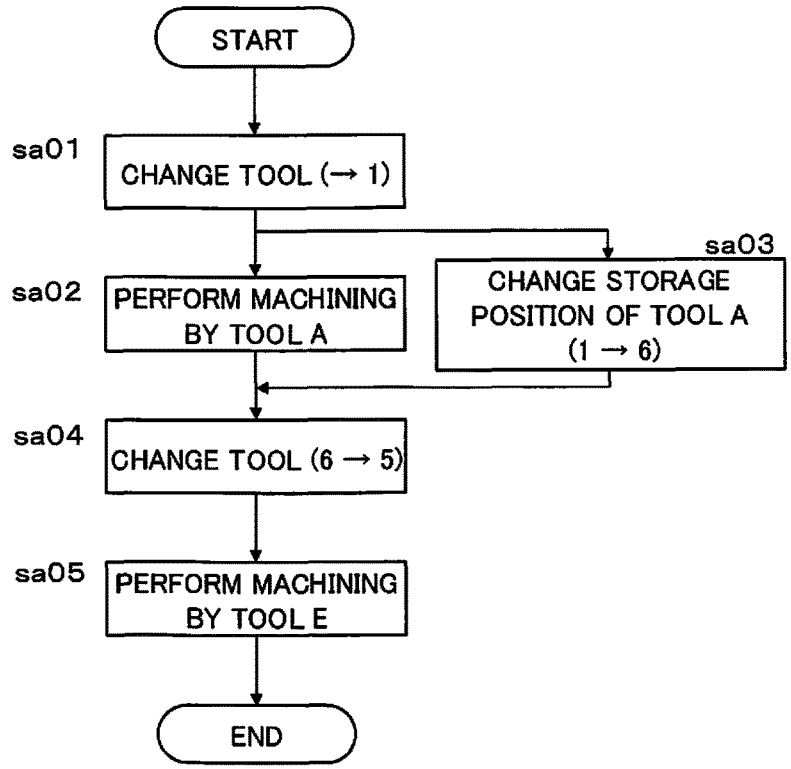
FIG. 3 is a flowchart illustrating the operation of the machine tool according to the one embodiment of the invention.
Figure 7:
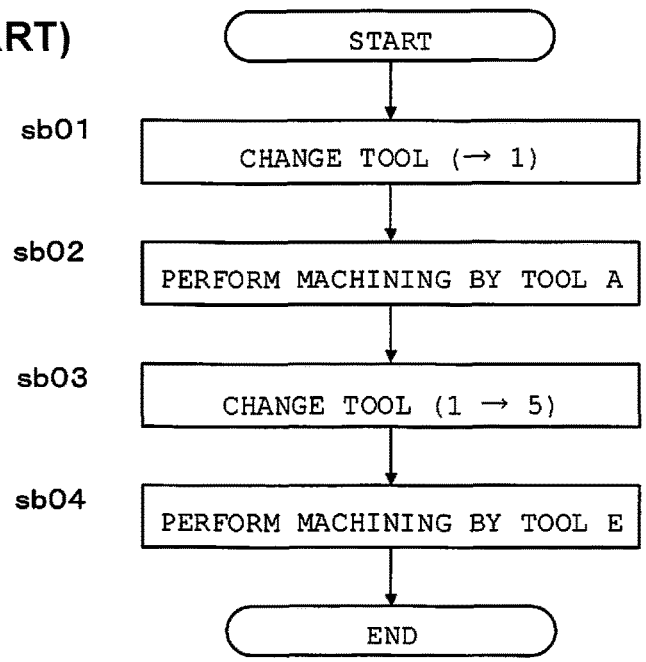
FIG. 7 is a flowchart illustrating the operation of a prior art machine tool.

FIG. 3 is a flowchart illustrating the operation of the machine tool according to the present embodiment. The following is a sequential description of steps of processing.

[Step sa01] Tool change is performed (or the tool A in the tool grip portion of tool number 1 is mounted on the spindle).

[Step sa02] Machining by the tool A is performed.

[Step sa03] As the operation of Step sa02 is carried out, the storage position for the tool A is changed from the tool grip portion of tool number 1 to the tool grip portion of tool number 6.

[Step sa04] Tool change is performed. More specifically, the tool A is returned to the tool grip portion of tool number 6. The tool magazine 24 is turned to index the tool E held by the tool grip portion of tool number 5 to the tool change position. Thereupon, the tool E is mounted on the spindle 27.

[Step sa05] Machining by the tool E is performed, whereupon the processing ends.

In the present embodiment, the distance of rotation of the magazine during the tool change can be reduced by previously changing the storage position for the tool currently in use while the spindle is in the machining area. Thus, the tool change time can be made shorter than in the conventional system.

According to the present embodiment, as described above, the tool storage position can be changed in the tool changer of a simple structure that does not have such a unit as a tool change arm for temporarily holding a tool. Thus, the storage position for the tool currently in use can be previously changed to a position near the tool to be used next, so that the tool change time can be reduced despite the simple structure of the tool changer.

In carrying out the present embodiment, the tool storage position may be changed to a tool grip portion already mounted with a tool, possibly causing the tool to fall off. To prevent this, recording unit may be provided for recording the tool grip portion on the tool magazine 24 in which the tool mounted. If a command is given to change the tool storage position to the tool grip portion already mounted with the tool with reference to the recording unit, the tool can be prevented from falling off by providing the function of generating an alarm.

According to the present embodiment, the control unit may be provided with the function of automatically changing the tool storage position to an optimal position, besides the function of directly generating the "tool storage position change" command in the machining program. For example, the control unit may be given functions of prefetching the machining program, specifying a tool grip portion of a tool number located nearest to the tool to be used next and mounted with no tool, and automatically generating the tool storage position change command for the specified position.

Further, the control unit may have the function of changing the tool storage position so that the deflection of the tool weight on the tool magazine 24 is not higher than a fixed value, thereby preventing a failure in the tool changer. First, the tool magazine 24 is halved by a plane that contains its pivot axis. When this is done, the difference between the respective total weights of the tool on one side and the tool on the other side is calculated. The maximum value of this difference is defined as the deflection of the tool weight.

If the deflection of the tool weight after tool storage position change is higher than the fixed value when the change of the tool storage position is commanded, the position change is suspended or the change destination of the tool storage position is automatically changed to another position. Thus, the deflection of the tool weight can be prevented from exceeding the fixed value due to the tool storage position.

In the present embodiment, moreover, the trouble of commanding change of tool arrangement data on the program or re-inputting tool information can be saved by automatically rewriting tool arrangement data on the tool magazine 24 as the tool storage position is changed. In the present embodiment, furthermore, display unit is provided for displaying the tool arrangement on the tool magazine, so that an operator can easily check the tool arrangement even when the tool storage position is changed.

The First Embodiment

A controller controls a machine tool 39 comprising a rotary tool magazine 24 capable of attaching and detaching a tool 28 to and from a spindle 27 of the machine tool 39, tool grip portions 25 circumferentially disposed on the tool magazine 24, and index unit (magazine drive motor) configured to turn the tool magazine 24 with the tool mounted on the spindle 27.

The controller comprises control unit configured to perform control such as to control the index unit during tool change, store the tool 28 mounted on the spindle 27 into the tool grip portion 25 indexed to a tool change position of the tool magazine 24, index a tool grip portion 25 stored with a tool 28 to be used next to the tool change position, and mount the tool on the spindle 27.

The controller comprises a command unit for outputting a change command for the tool storage position to the control unit and the control unit turns the tool magazine 24 with the tool 28 mounted on the spindle 27 and controls the index unit (magazine drive motor) to index a predetermined tool grip portion 25 to the tool change position on receiving the change command for the tool storage position from the command unit.

The Second Embodiment

The controller comprises a storage unit configured to store a machining program including a block for commanding the storage position for the tool mounted on the spindle 27 to be changed to a designated tool storage position. The command unit issues the change command for the tool storage position to the control unit when the block for commanding the change of the tool storage position is read by the command unit during the execution of the machining program by the control unit.

The Third Embodiment

The controller comprises a data input unit for inputting the presence/absence of the tool 28 in each of the tool grip portions 25 on the tool magazine 24 and a recording unit for recording input data on the presence/absence of the tool 28. The control unit comprises an alarm output unit configured to issue a warning when the change of the tool storage position is commanded from the command unit to the tool grip portion 25 already mounted with the tool 28, based on the recorded input data on the presence/absence of the tool 28.

The Fourth Embodiment

The tool magazine 24 comprises a tool detection unit for detecting the presence/absence of the tool 28 in each of the tool grip portions 25 on the tool magazine 24 and a recording unit for recording detection data on the presence/absence of the tool detected by the tool detection unit. The control unit comprises an alarm output unit configured to issue a warning when the change of the tool storage position is commanded to the tool grip portion 25 already mounted with the tool 28, based on the recorded detection data on the presence/absence of the tool 28.

The Fifth Embodiment

The controller comprises a data input unit for inputting the presence/absence of the tool in each of the tool grip portions 25 on the tool magazine 24 and a recording unit for recording input data on the presence/absence of the tool 28. The command unit analyzes a machining program executed by the machine tool, specifies the tool grip portion 25 stored with a tool 28 to be used next, and identifies the position of the tool grip portion 25 mounted with none of the tools 28 on the tool magazine 24, based on the input data of the recording unit on the presence/absence of the tool 28. The command unit automatically gives a command to the control unit to change the tool storage position to that tool grip portion 25, among the other tool grip portions 25 without any of the tools 28 therein, which is located at the shortest distance of rotation from the tool grip portion 25 stored with the tool 28 to be used next.

The Sixth Embodiment

The tool magazine 24 comprises a tool detection unit for detecting the presence/absence of the tool 28 in each of the tool grip portions on the tool magazine, and the controller comprises recording unit for recording detection data on the presence/absence of the tool 28 detected by the tool detection unit. The command unit of the controller analyzes a machining program executed by the machine tool 39, specifies the tool grip portion 25 stored with a tool to be used next, identifies the position of the tool grip portion 25 mounted with none of the tools 28, based on the detection data of the recording unit on the presence/absence of the tool 28, and automatically gives a command to the control unit to change the tool storage position to that tool grip portion 25, among the other tool grip portions 25 without any of the tools 28 therein, which is located at the shortest distance of rotation from the tool grip portion 25 stored with the tool 28 to be used next.

The Seventh Embodiment

The recording unit of Embodiment 5 or 6 records the weight and arrangement of the tool 28 on the tool magazine 24, and the control unit comprises an output unit, and configured to calculate a difference between the total weight of the tool on one-side area of the tool magazine 24, which is halved by a plane containing a pivot axis of the tool magazine 24, and the total weight of the tool on the other-side area, with reference to the recording unit, define the maximum of differences between the tool weights calculated for some predetermined planes containing the pivot axis as a tool weight deflection value, previously calculate the tool weight deflection value after the change of the tool storage position during the execution of the tool storage position change, and send a command to an output unit and the output unit displays an alarm or a message if the previously calculated tool weight deflection value is not lower than a predetermined value.

The Eighth Embodiment

The recording unit of Embodiment 5 or 6 records the weight and arrangement of the tool on the tool magazine 24, and the control unit calculates a difference between the total weight of the tool 28 on one-side area of the tool magazine 24, which is halved by a plane containing a pivot axis of the tool magazine 24, and the total weight of the tool on the other-side area, with reference to the recording unit, defines the maximum of differences between the tool weights calculated for some predetermined planes containing the pivot axis as a tool weight deflection value, previously calculates the tool weight deflection value after the change of the tool storage position during the execution of the tool storage position change, and modifies the tool change position to be changed to the tool grip portion 25 located at the next shortest distance of rotation from the next tool, not to the tool grip portion located at the shortest distance, if the previously calculated tool weight deflection value is not lower than a predetermined value.

The Ninth Embodiment

The controller comprises a data input unit for inputting tool arrangement data on the tool magazine 24, the recording unit records the tool arrangement data on the tool magazine 24 input by the data input unit, and the control unit rewrites the tool arrangement data recorded by the recording unit when the tool storage position is changed.

The Tenth Embodiment

The controller comprises a display unit for displaying the tool arrangement data on the tool magazine 24.

The invention claimed is:

1. A tool changer for a machine tool, comprising:
a rotary tool magazine configured to attach and detach tools to and from a spindle of the machine tool, the tools comprising a first tool and a second tool to be mounted on the spindle after the first tool, the rotary tool magazine including tool storage positions at least including a first, a second and a third tool storage positions;
tool grip portions circumferentially disposed on the tool magazine corresponding to the tool storage positions;
an index unit configured to turn the tool magazine while one of the tools is mounted on the spindle;
and a control unit configured to control the index unit, during a tool change operation,
wherein
the first tool was stored at the first tool storage position before being mounted to the spindle, and the third tool storage position is empty during the entire time that the first tool is mounted on the spindle,
the tool changer comprises a command unit for outputting, to the control unit a change command for changing a tool storage position for the first tool from the first tool storage position where the first tool was stored before being mounted on the spindle to the third tool storage position where the first tool is to be stored after being removed from the spindle, wherein the third tool storage position is closer to the second tool storage position where the second tool is stored than to the first tool storage position,
the index unit is configured to rotate the tool magazine even when the first tool is mounted on the spindle, and
the control unit is configured to
on receiving the change command from the command unit, turn the tool magazine while the first tool is mounted on the spindle, and control the index unit to index the tool grip portion corresponding to the third tool storage position to a tool change position to store the first tool mounted on the spindle into the third tool storage position, then
control the index unit to index the second tool storage position stored with the second tool to the tool change position to mount the second tool on the spindle after the first tool.

2. The tool changer according to claim 1, further comprising a storage unit configured to store a machining program, the machining program including a block for commanding a change of the tool storage position for the tool mounted on the spindle, wherein the command unit issues the change command when the block for commanding changing the tool storage position is read by the command unit during the execution of the machining program by the control unit.

3. The tool changer according to claim 1, further comprising a data input unit for inputting presence or absence of a tool in each of the tool grip portions on the tool magazine and a recording unit for recording input data on the presence or absence,
wherein the control unit is configured to issue a warning when the change of the tool storage position for the tool mounted on the spindle is commanded from the command unit to a tool grip portion already mounted with another tool, based on the recorded input data on the presence or absence.

4. The tool changer according to claim 1, wherein
the tool changer is configured to detect presence or absence of a tool in each of the tool grip portions on the tool magazine and detection data on the presence or absence is recorded, and
wherein the control unit is configured to issue a warning when the change of the tool storage position for the tool mounted on the spindle is commanded to a tool grip portion already mounted with another tool, based on the recorded detection data.

5. The tool changer according to claim 1, further comprising a data input unit for inputting presence or absence of a tool in each of the tool grip portions on the tool magazine and a recording unit for recording input data on the presence or absence, wherein
the command unit is configured to
analyze a machining program executed by the machine tool,
specify the second tool grip portion stored with the second tool to be mounted on the spindle after the first tool, identify a position of the tool grip portion corresponding to the third tool storage position, based on the input data of the recording unit on the presence or absence, and
automatically give the change command to the control unit to change the tool storage position for the first tool to the tool grip portion corresponding to the third tool storage position, which tool grip portion corresponding to the third tool storage position, among the other tool grip portions without any of the tools therein, is located at the shortest distance of rotation from the second tool grip portion stored with the second tool to be mounted on the spindle after the first tool.

6. The tool changer for a machine tool according to claim 5, wherein the recording unit is configured to record the weight and arrangement of the tools stored by the tool magazine.

7. The tool changer according to claim 1,
wherein the tool changer is configured to detect presence or absence of a tool in each of the tool grip portions on the tool magazine and detection data on the presence or absence is recorded, and
wherein the command unit is configured
to analyze a machining program executed by the machine tool,
specify the second tool grip portion stored with the second tool to be mounted on the spindle after the first tool,
identify a position of the tool grip portion corresponding to the third tool storage position, based on the detection data, and
automatically give the change command to the control unit to change the tool storage position for the first tool to the tool grip portion corresponding to the third tool storage position, which tool grip portion corresponding to the third tool storage position, among the other tool grip portions without any of the tools therein, is located at the shortest distance of rotation from second the tool grip portion stored with the second tool to be mounted on the spindle after the first tool.

8. The tool changer for a machine tool according to claim 1, further comprising a recording unit configured to record the weight and arrangement of the tools stored by the tool magazine.

9. The tool changer according to claim 1, further comprising a data input unit for inputting tool arrangement data about arrangement of tools on the tool magazine, wherein
the command unit is configured to record the tool arrangement data input by the data input unit and
the command unit is configured to rewrite the tool arrangement data recorded by the recording unit when the first tool storage position for the first tool is changed to the third tool storage position.

10. The tool changer according to claim 9, further comprising a display unit for displaying the tool arrangement data.

* * * * *